US009285495B2

(12) United States Patent
Erneland

(10) Patent No.: US 9,285,495 B2
(45) Date of Patent: Mar. 15, 2016

(54) METHODS AND APPARATUS FOR NODE POSITIONING DURING SEISMIC SURVEY

(75) Inventor: Michael B. Erneland, Loddekopinge (SE)

(73) Assignee: PGS Geophysical AS, Oslo (NO)

(*) Notice: Subject to any disclaimer, the term of this patent is extended or adjusted under 35 U.S.C. 154(b) by 877 days.

(21) Appl. No.: 13/431,114

(22) Filed: Mar. 27, 2012

(65) Prior Publication Data

US 2013/0258807 A1      Oct. 3, 2013

(51) Int. Cl.
*G01V 1/38* (2006.01)
*G01V 1/28* (2006.01)

(52) U.S. Cl.
CPC ................... *G01V 1/3835* (2013.01)

(58) Field of Classification Search
CPC ............ G01V 1/3835; G01V 1/3843
USPC ....................................... 367/16, 19
See application file for complete search history.

(56) References Cited

U.S. PATENT DOCUMENTS

| | | | |
|---|---|---|---|
| 4,231,111 A * | 10/1980 | Neeley | 367/19 |
| 5,031,159 A * | 7/1991 | Rouquette | 367/125 |
| 5,251,183 A | 10/1993 | McConnell et al. | |
| 5,640,325 A * | 6/1997 | Banbrook et al. | 701/505 |
| 8,606,440 B2 * | 12/2013 | Solheim | 701/21 |
| 8,724,426 B2 * | 5/2014 | Welker | 367/19 |
| 2004/0073373 A1 * | 4/2004 | Wilson | 702/16 |
| 2007/0127312 A1 * | 6/2007 | Storteig et al. | 367/15 |
| 2008/0253225 A1 | 10/2008 | Welker et al. | |
| 2009/0245019 A1 * | 10/2009 | Falkenberg et al. | 367/17 |

* cited by examiner

*Primary Examiner* — Daniel L Murphy

(57) ABSTRACT

Disclosed are apparatus and methods acoustic node positioning during a marine survey. In one embodiment, positions of a plurality of nodes are calibrated using acoustic transceivers. In addition, changes in the positions of the nodes are tracked using accelerometers. In another embodiment, a traveling wave is detected, and an effect of the traveling wave is projected on steering devices in a projected path of the traveling wave. Time-dependent control signals are computed and applied to the steering devices to maintain a local streamer geometry. Other embodiments, aspects, and features are also disclosed.

21 Claims, 11 Drawing Sheets

FIG. 3     300

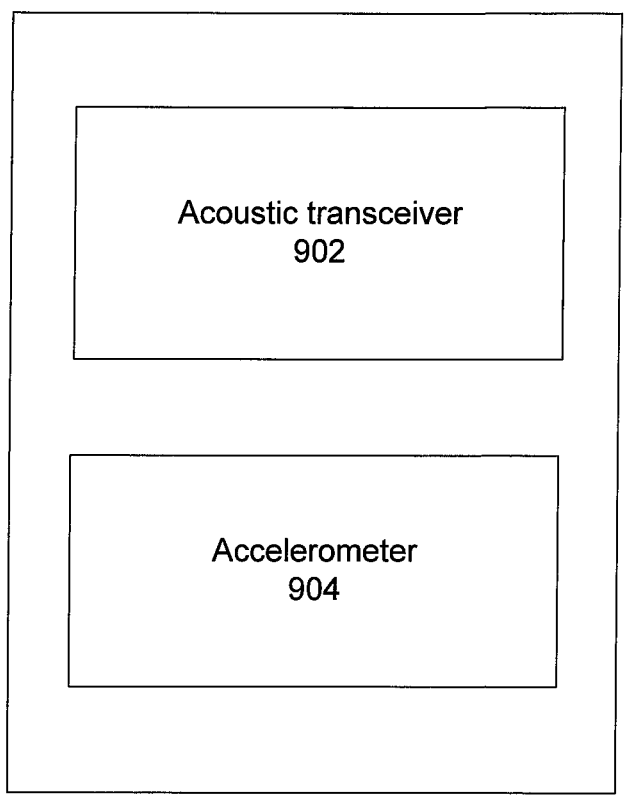
FIG. 9     809

METHODS AND APPARATUS FOR NODE POSITIONING DURING SEISMIC SURVEY

BACKGROUND

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. One technique of geophysical prospecting is a seismic survey. In a marine seismic survey, the seismic signal will first travel downwardly through a body of water overlying the subsurface of the earth.

Seismic energy sources (active seismic sources) are generally used to generate the seismic signal. Conventional energy sources for marine seismic surveys include air guns, water guns, marine vibrators, and other devices for generating acoustic wave-forms. After the seismic signal propagates away from the source, it is at least partially reflected by subsurface seismic reflectors of the earth body and by the sea surface (air-water contact). Such seismic reflectors are typically interfaces between subterranean formations having different elastic properties, specifically wave velocity and rock density, which lead to differences in acoustic impedance at the interfaces.

The reflections may be detected by marine seismic sensors (also called receivers) which may be towed in the water using streamers attached to a vessel traveling over the survey area. Conventional types of marine seismic sensors include particle-velocity sensors (geophones), water-pressure sensors (hydrophones), and other types of sensors. The resulting seismic data may be recorded and processed to yield information relating to the geologic structure and properties of the subterranean formations and their potential hydrocarbon content.

One challenge with marine seismic surveying is tracking and controlling positions of the sensors as they are being towed in the body of water. For example, the streamers may shift as they are being towed due to currents in the body of water. This may result in changes in the relative positions of the sensors.

BRIEF DESCRIPTION OF THE DRAWINGS

FIG. 9 is a schematic diagram depicting components of a positioning device on an individual air gun in accordance with an embodiment of the invention.

Note that the figures provided herewith are not necessarily to scale. They are provided for purposes of illustration to ease in the understanding of the presently-disclosed invention.

DETAILED DESCRIPTION

Figure 1:
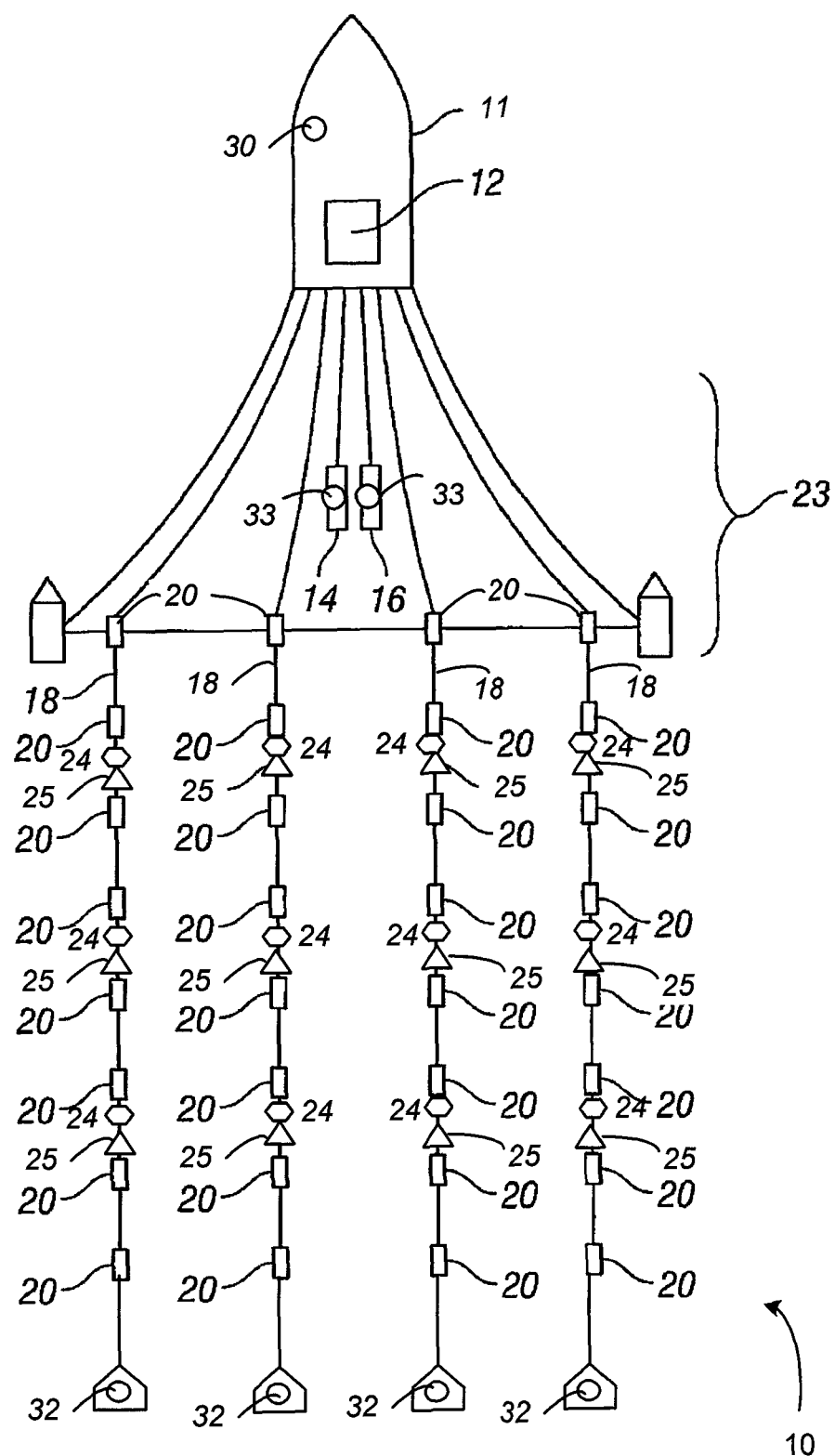
FIG. 1 is a plan view of a marine seismic surveying system with apparatus for acoustic node positioning in accordance with an embodiment of the invention.

The present disclosure provides methods and apparatus for tracking and maintaining acoustic node positions during a marine seismic survey. The marine seismic survey may be performed using a marine seismic surveying system 10 as shown in FIG. 1, for example.

As shown, the system 10 may include at least one seismic source (14 and 16) and a plurality of streamers 18 being towed underwater by towing equipment 23 attached to a vessel 11. The seismic sources (14 and 16) may be configured to generate seismic signals which may be reflected from geological structures below the bottom of the body of water. For example, in one implementation, the seismic sources (14 and 16) may be composed of six arrays split into two groups, referred to as a port source (14) and a starboard source (16), such that each of these sources comprises three individual arrays. A plurality of seismic receivers 20 may be attached to, or embedded in, the streamers 18 at spaced intervals so as to measure one or more resultant wave fields over time. The wave field data may be recorded by an on-board control and data recording system 12 and may be subsequently processed by a data processing system to determine information about the sub-bottom geological structures.

The marine seismic surveying system 10 may include various positioning apparatus. The positioning apparatus may include one or more global positioning system (GPS) receivers 30 on the vessel 11 (or, alternatively, attached to or towed by the vessel 11) and a plurality GPS receivers 32 on tail buoys at the end of each streamer 18. GPS receivers 33 may also be configured on one or both of the seismic sources 14 and 16. The aforementioned GPS receivers (32 and 33) that are being towed may be relative GPS (rGPS) units which may determine positions relative to a master reference receiver (which may be, for example, the GPS receiver 30 on the vessel). The positioning apparatus may further include a plurality of acoustic nodes 24 and a plurality of steering nodes 25 on each streamer 18. Note that only a few acoustic nodes 24 and a few steering nodes 25 are shown on each streamer 18 for ease of illustration, but, in practice, each streamer 18 may include a larger number of acoustic nodes 24 and steering nodes 25 distributed along its length. The acoustic nodes 24 spaced apart on the multiple streamers 18 form an acoustic node array. Similarly, the steering nodes 25 spaced apart on the multiple streamers 18 form a steering node array. In one embodiment, a steering node 25 may be placed adjacent to, or in the vicinity of, each acoustic node 24.

Figure 2:
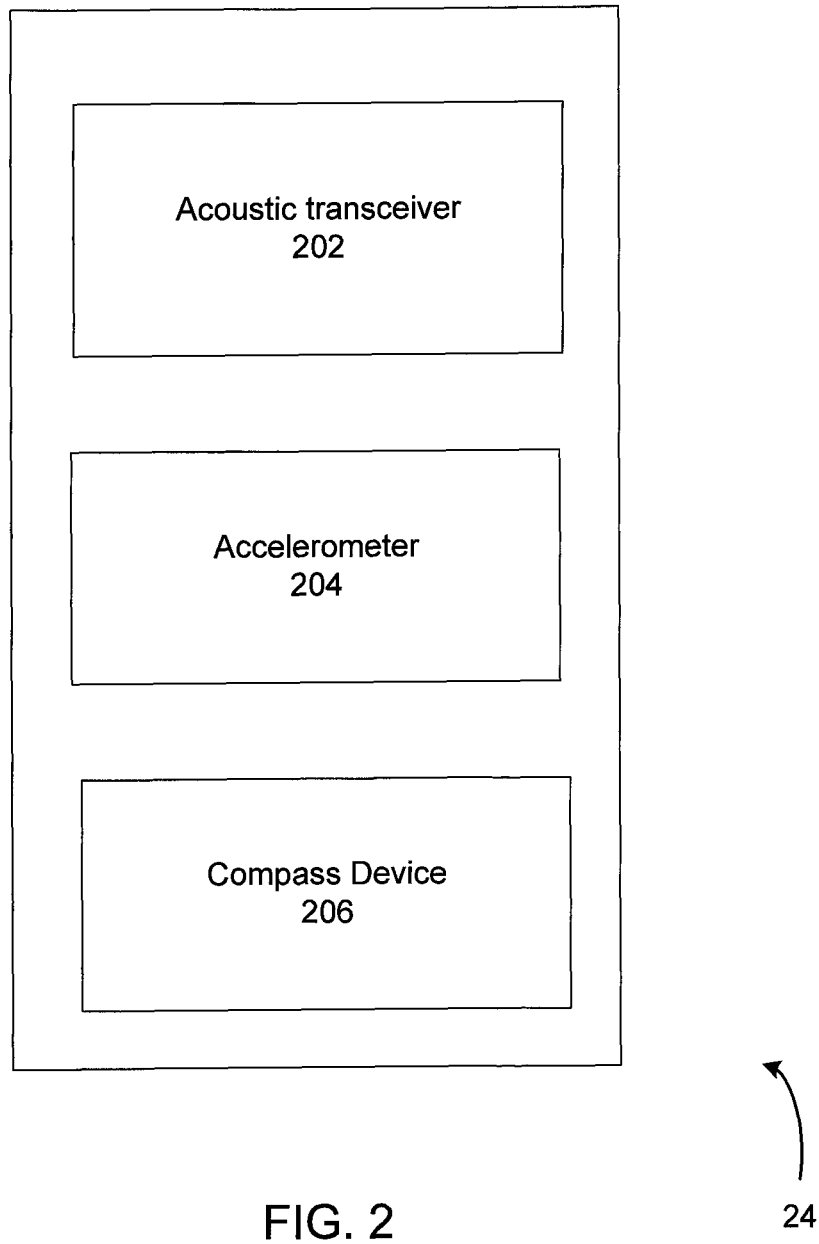
FIG. 2 is a block diagram depicting components of an acoustic node in accordance with an embodiment of the invention.

As shown in FIG. 2, in accordance with an embodiment of the invention, an acoustic node 24 may include an acoustic transceiver 202 and an accelerometer 204. The accelerometer 204 may be integrated into the same device as the acoustic transceiver 202 or may be arranged nearby the acoustic transceiver 202 along the streamer 18.

Figure 3:
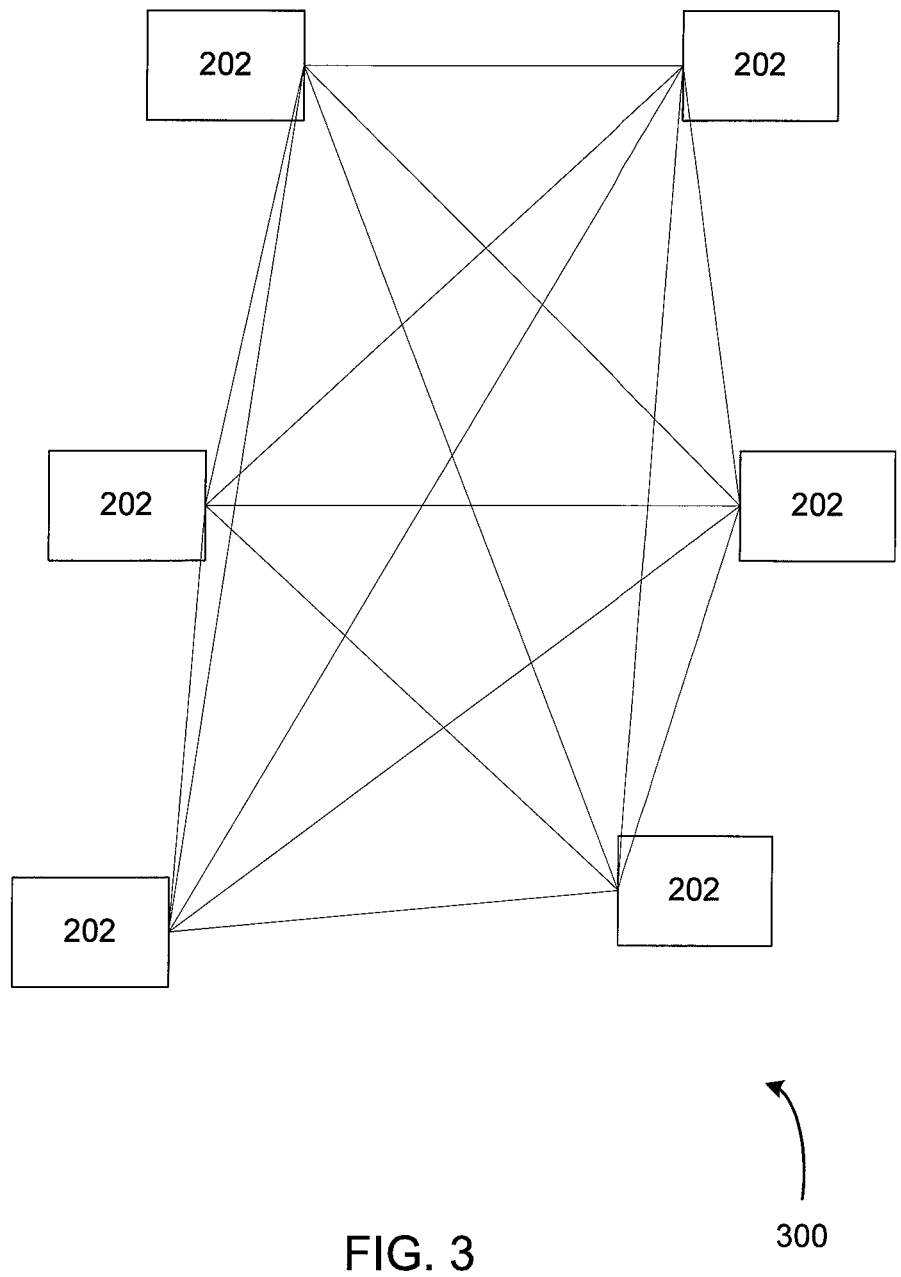
FIG. 3 is a schematic diagram showing an acoustic network formed by a small set of acoustic nodes in accordance with an embodiment of the invention.

The acoustic transceivers 202 communicate acoustic signals between each other and, as such, together form an acoustic network. For purposes of illustration, an example acoustic network 300 formed by a relatively small set of acoustic transceivers 202 (each on its own acoustic node 24) is depicted in FIG. 3. Each acoustic transceiver 202 may be configured to send and receive acoustic positioning signals from other acoustic transceivers 202 in the acoustic network so as to calibrate (determine) their relative positions. This acoustic calibration may be performed periodically, such as, for example, once every ten seconds. The control system for the positioning apparatus may be configured to avoid performing an acoustic calibration if it would interfere with a shot from the seismic source 14 or the subsequent seismic data collection.

The accelerometer 204 may be a three-axis accelerometer implemented using MEMS (micro-electromechanical system) or NEMS (nano-electromechanical system) devices and may be configured for use as an inertial navigation device. In accordance with an embodiment of the invention, each accelerometer 204 may be utilized to measure a time-dependent acceleration vector at, or in a vicinity of, an acoustic node 24. The accelerometer data may be transmitted from the accelerometers 204 to the on-board control and data recording system 12.

As further shown, the acoustic node 24 may also include a compass device 206. The compass device 206 may be configured to detect a directional orientation of the streamer 18 at the position of the acoustic node 24.

As described further below, the acoustic transceiver 202, the accelerometer 204, and the compass device 206 may be utilized to accurately and efficiently track the position of the acoustic node 24 during the seismic survey, both between an acoustic calibration and a seismic shot and also between shots during data reception.

Figure 4:
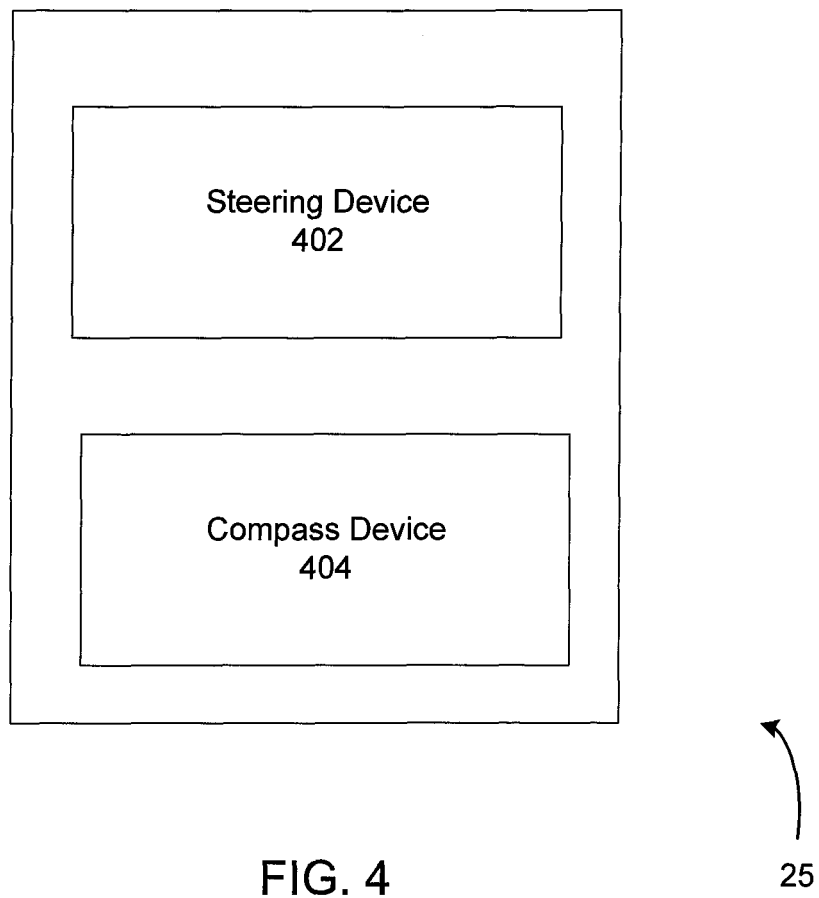
FIG. 4 is a block diagram depicting components of a steering node in accordance with an embodiment of the invention.

FIG. 4 is a block diagram depicting components of a steering node 25 in accordance with an embodiment of the invention. As shown, the steering node 25 may include a steering device 402 and a compass device 404. The steering device 402 may be applied to actively steer the node 25 in a vertical and/or lateral direction. The compass device 404 may be utilized to detect a directional orientation of the streamer 18 at the position of the steering node 25. These steering devices 402 may be any type of electronically-controllable steering devices, whether already known or to be developed.

Figure 5:
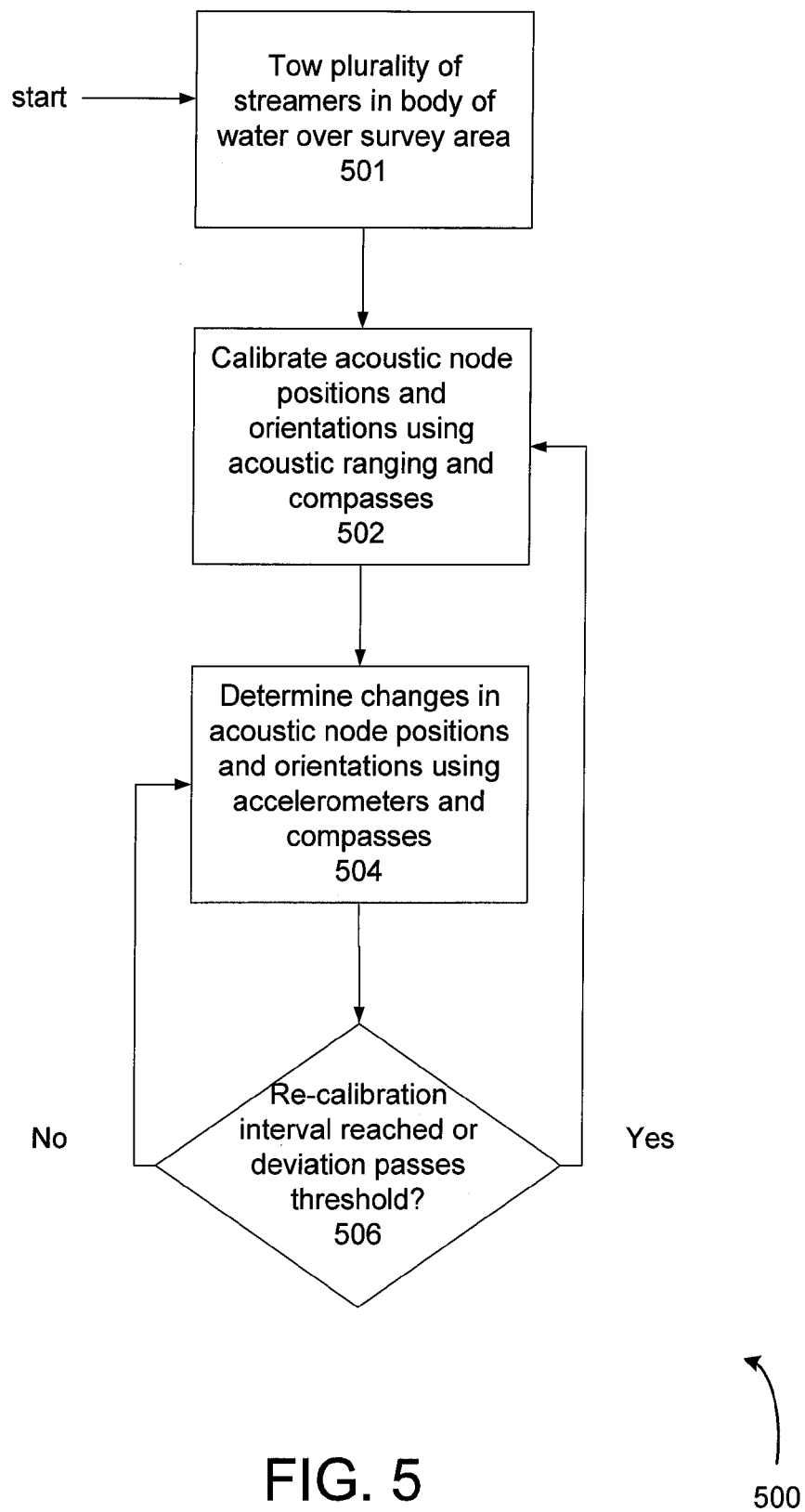
FIG. 5 is a flow chart of a method of tracking positions of acoustic nodes during a marine seismic survey in accordance with an embodiment of the invention.

FIG. 5 is a flow chart of a method 500 of tracking positions of acoustic nodes during a marine seismic survey in accordance with an embodiment of the invention. Per block 501 multiple streamers 18 may be towed in a body of water over a survey area so as to perform the marine seismic survey.

Per block 502, during the marine seismic survey, positions of at least a portion of the acoustic nodes are calibrated with acoustic ranging signals. This involves transmitting and receiving acoustic ranging signals between the acoustic transceivers 202 to determine distances of the acoustic nodes 24 relative to each other and using the compass devices 206 to determine directional orientations of the nodes 24. The absolute positions of the acoustic nodes 24 at each calibration may then be determined using the relative position information in combination with absolute position information from the GPS receivers (30 and 32). The acoustic calibration per block 502 may be applied to a portion (for example, half) of the acoustic nodes at a time and may be applied periodically, such as, for example, once every several (e.g., five to ten) minutes or more. In contrast, a conventional acoustic positioning system would re-calibrate every eight to ten seconds. The acoustic calibration may be halted or delayed when it would interfere with a shot from the seismic source 14 or the subsequent seismic data collection.

Per block 504, in the interval between acoustic calibrations, determinations may be made as to changes in the positions of the acoustic nodes 24 using the accelerometers 204 and changes in the directional orientations of the nodes 24 using the compass devices 206. In accordance with an embodiment of the invention, each accelerometer 204 may be utilized to measure a time-dependent acceleration and/or velocity vector at, or near, an acoustic node 24, and the acceleration and/or velocity data ("accelerometer data") may be transmitted from the accelerometers 204 to the on-board control and data recording system 12. The time-dependent acceleration vector for a particular acoustic node 24 indicates the time-dependent change in the velocity vector for that node 24. In addition, the compass devices 206 may transmit directional orientation data for the nodes 24 to the system 12. Hence, given the positions and velocity vectors for the acoustic nodes 24 at the time of the last acoustic calibration, the acceleration and orientation data enable the system to determine changes in the positions and orientations of the acoustic nodes 24 during the interval between acoustic calibrations.

The accelerometers are used to determine the changes in acoustic node positions until, per block 506, either the re-calibration interval is reached (i.e. until the time is reached for the next acoustic calibration), or a deviation of an acoustic node from an expected position passes a threshold distance. The expected position of an acoustic node at time t after the latest calibration may be $(x+\Delta x(t), y+\Delta y(t), z+\Delta z(t))$, where the position at the latest calibration is $(x, y, z)$, and the predicted change in position from the latest calibration is $(\Delta x(t), \Delta y(t), \Delta z(t))$. The predicted change in position may be computed, for example, using position and velocity data from one or more GPS receivers (30 and/or 32) and streamer orientation information from the compass devices (206 and/or 404). When the re-calibration interval is reached or when a deviation passes the threshold, an acoustic calibration is performed per block 502. The deviation may be computed as the difference between the predicted change in position of an acoustic node 24 and the accelerometer-determined change in position of the same node 24.

While conventional marine seismic surveying systems must make rough assumptions as to the movement of the streamers 18 for the time period between the last acoustic calibration and each shot point, the presently-disclosed technique uses the data from the accelerometers 204 to more accurately track the actual movement of the streamers 18 during this period. This results in more accurate receiver position information which leads to greater accuracy in the seismic data obtained. Furthermore, by using the accelerometers 204 to more accurately track the movement of the streamers 18, the re-calibration interval between acoustic ranging calibrations may be made substantially longer. For example, in practice, instead of performing an acoustic calibration every 8 to 10 seconds during a survey, the time period between acoustic calibrations may be extended to a minute, or several minutes, or more.

Figure 6:
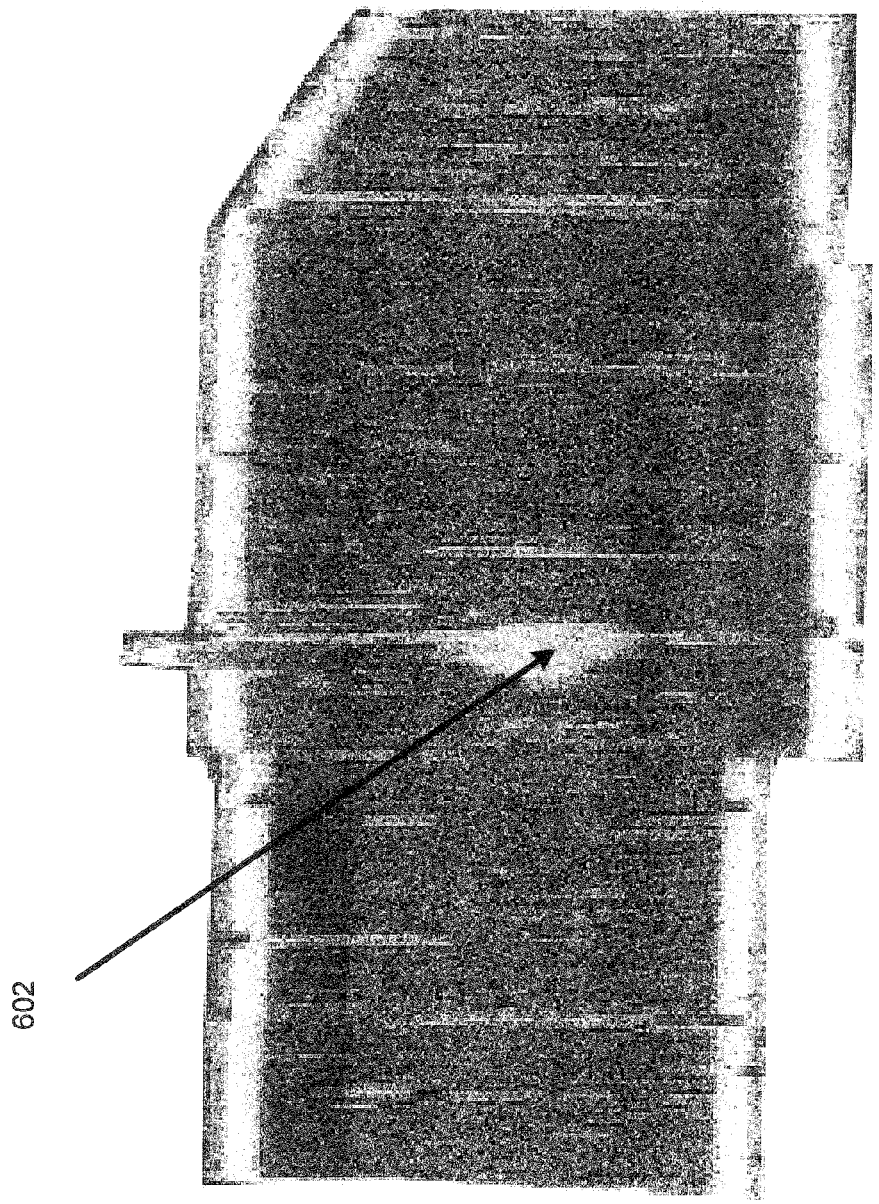
FIG. 6 shows a coverage plot of a marine seismic survey with a hole in the coverage that may be prevented in accordance with an embodiment of the invention.

FIG. 6 shows a coverage plot of a marine seismic survey with a hole 602 in the coverage that may be prevented in accordance with an embodiment of the invention. The hole in the coverage over a survey area may occur, for example, due to a heavy current striking the streamers 18 during an interval between acoustic calibrations in a conventional acoustic node positioning system. Such a heavy current may displace the streamers 18 so that they do not cover the intended area as they are towed by the vessel 11. Such a hole in the coverage may be prevented using the method 700 described below in relation to FIG. 7.

Figure 7:
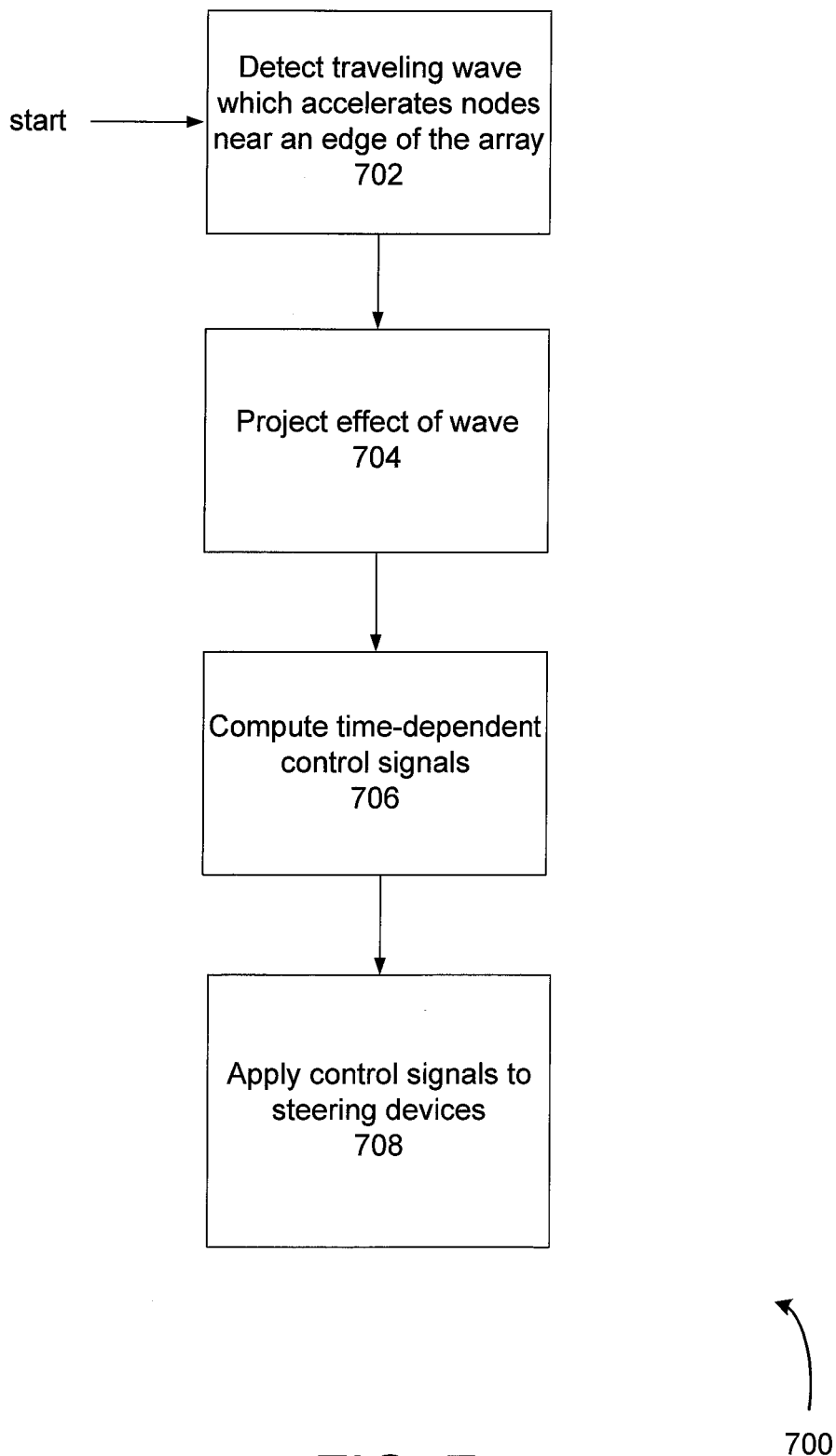
FIG. 7 is a flow chart of a method of predictively maintaining a spread of acoustic nodes in accordance with an embodiment of the invention.

FIG. 7 is a flow chart of a method 700 of predictively maintaining a spread of acoustic nodes in accordance with an embodiment of the invention. Note that, during a marine seismic survey, the method 700 of predictively maintaining a spread of acoustic nodes per FIG. 7 may be combined with the method 500 of tracking positions of the acoustic nodes per FIG. 5. In other words, in accordance with an embodiment of the invention, the steps in both methods 500 and 700 may be performed during a marine seismic survey.

Per block 702, a traveling wave in the water may be detected which moves nodes near an edge of the acoustic node array in an accelerated manner. The detection of the wave's position and velocity, and the acceleration it causes at the acoustic nodes, may be accomplished using the accelerators 204 at a first subset of the acoustic nodes 24 near the edge of the array of the acoustic nodes. For example, the position and velocity of the wave may be determined from the times at which it affects the first couple of rows of the acoustic nodes 24 at the edge of the array.

Per block 704, the effect of the wave may be projected to other nodes in the array. In one embodiment, the effect of the wave may be projected to a subset of steering nodes 25 which may be located in the path of the traveling wave. The projection may be performed by extrapolating the motion of the traveling wave over time and so predicting the future effect of the wave on the steering nodes 25.

Per block 706, time-dependent control signals to be applied at the steering nodes 25 may be determined. The control signals may be determined so as to counter the predicted effect of the approaching traveling wave on the steering nodes 25. The control signals may specify, for example, a direction and power level to be applied by each independently-controlled steering node 25.

Finally, per block 708, the projected effect of the wave may be pre-emptively countered by applying the time-dependent control signals to the aforementioned subset of steering nodes 25 which are located in the path of the traveling wave, where the steering nodes may be configured to steer up/down, laterally, or both up/down and laterally. As a result, the relative positions within the subset of steering nodes 25 may be maintained. Since the subset of steering nodes 25 are distributed on one or more streamers 18, maintaining the relative positions within the subset of steering nodes 25 results in the local geometry of the streamers 18 being maintained around the subset of steering nodes 25. As such, the relative positions of a second subset of acoustic nodes 24 may also be maintained, where the second subset of acoustic nodes 24 is within the local geometry of streamers 18 being maintained.

Figure 8:
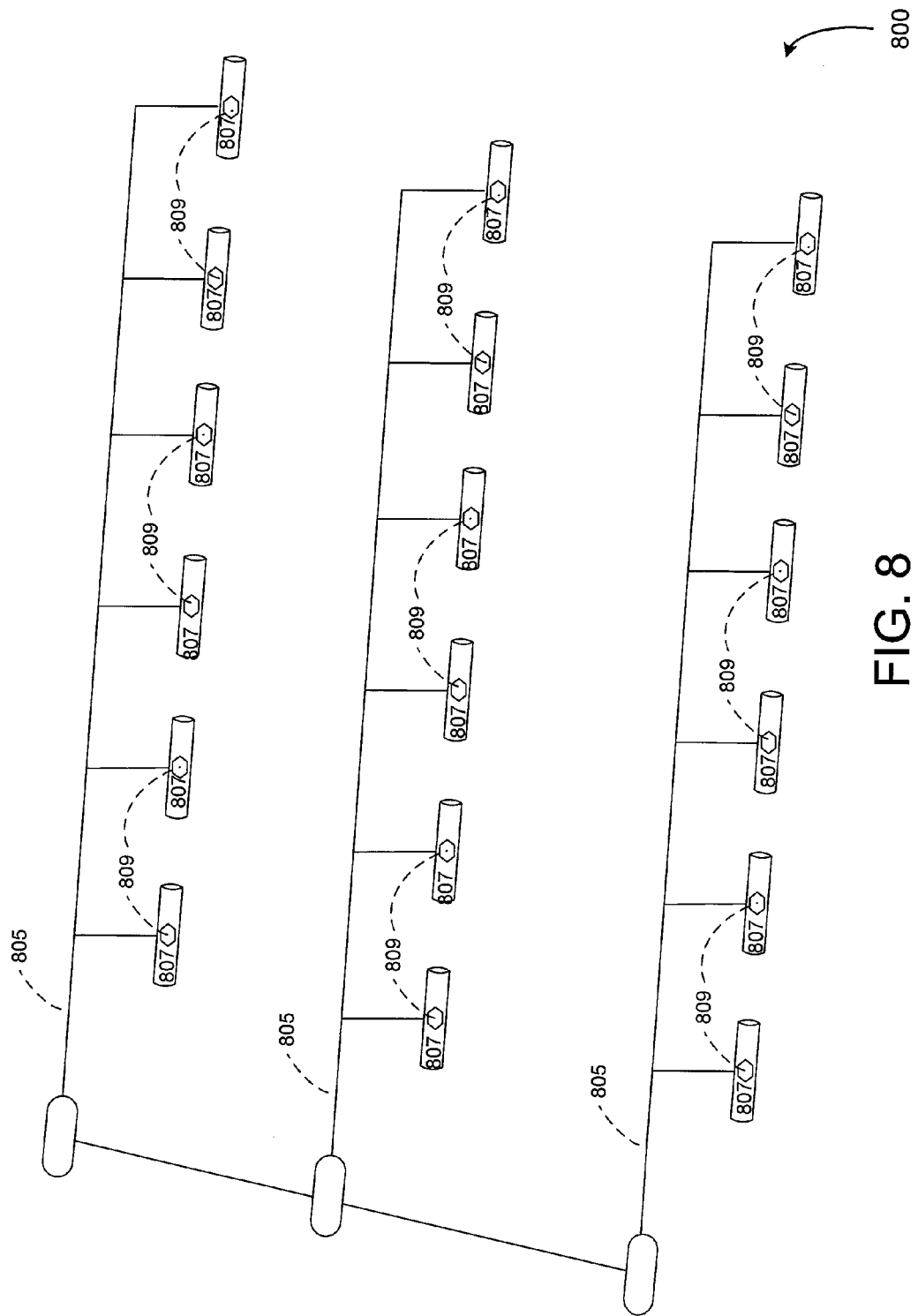
FIG. 8 is a schematic diagram showing an example source gun array in accordance with an embodiment of the invention.

FIG. 8 is a schematic diagram showing a source gun array 800 in accordance with an embodiment of the invention. The source gun array 800 may be used, for example, as the port source 14 or the starboard source 16 shown in FIG. 1. As shown, the source gun array 800 may include multiple (in this example, three) sub-arrays 805, each sub-array 805 including multiple (in this example, six) seismic source devices or guns (such as, for example, air guns or water guns) 807. Each individual gun 807 may have a positioning device 809 associated therewith. As shown in the block diagram of FIG. 9, in accordance with an embodiment of the invention, each positioning device 809 associated with a source gun 807 may include an acoustic transceiver 902 and an accelerometer 904. As described further below, the acoustic transceiver 902 and the accelerometer 904 may be utilized to accurately and efficiently track the position of the source gun 807 during the seismic survey, not only before a seismic shot, but also in between shots during data reception.

Figure 10:
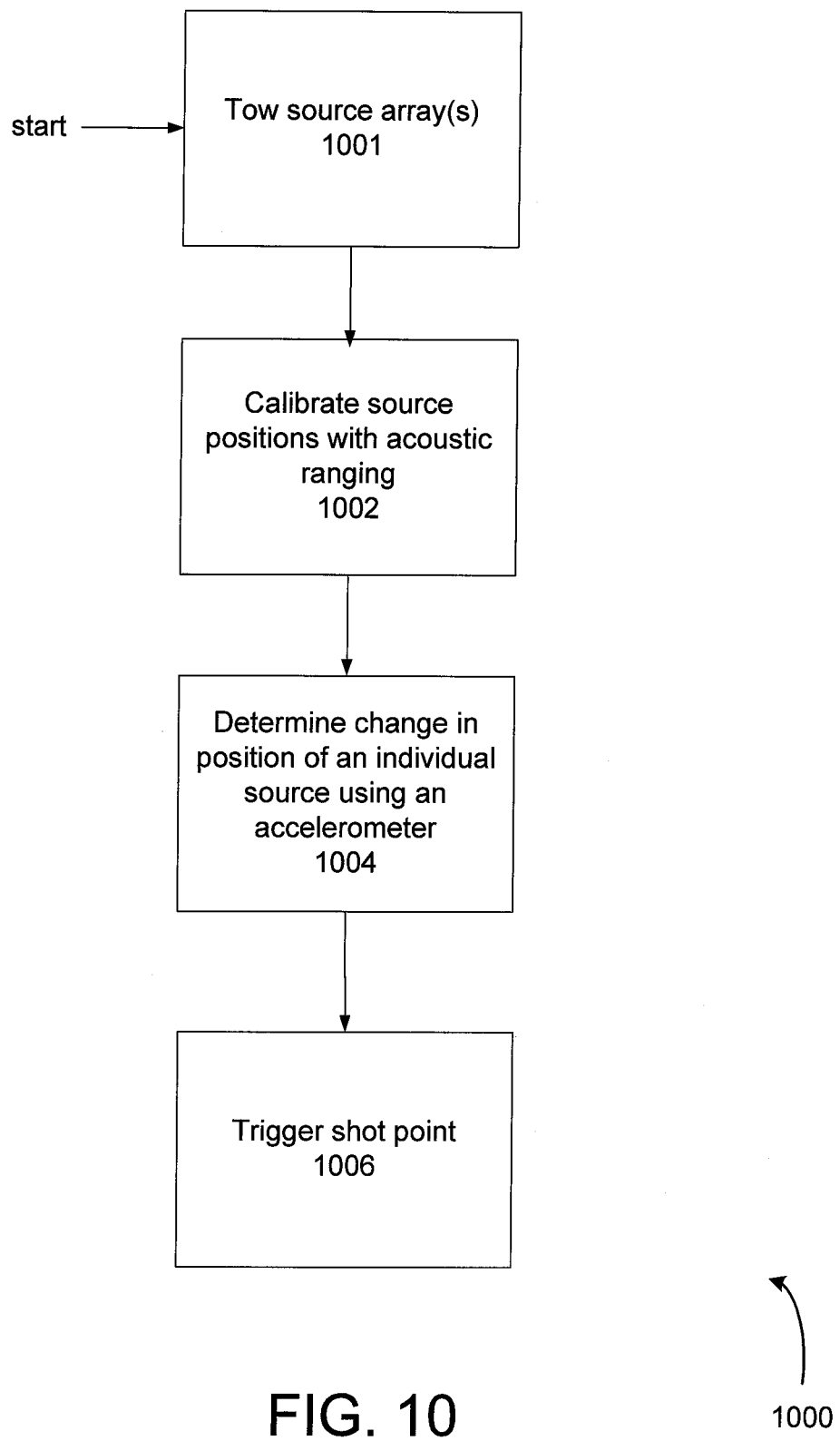
FIG. 10 is a flow chart of a method of tracking positions of individual air guns during a seismic survey in accordance with an embodiment of the invention.

FIG. 10 is a flow chart of a method 1000 of tracking positions of individual air guns during a seismic survey in accordance with an embodiment of the invention. Per block 1001, one or more source arrays 800 may be towed in a body of water over a survey area.

Per block 1002, at a time close to the time when a shot point is to be triggered, the positions of guns in the array may be calibrated by acoustic ranging. This involves transmitting and receiving acoustic ranging signals between the acoustic transceivers 902 to determine positions of the guns 807 relative to each other. The absolute positions of the guns 807 may then be determined using the relative position information in combination with absolute position information from one or more GPS receivers 33 (which may be, for example, attached to one or more of the sources 14 and 16, as depicted in FIG. 1).

Per block 1004, after the acoustic calibration, the accelerometers 904 may be utilized to determine changes in the velocity of each individual gun 807, and the accelerometer data may be transmitted from the accelerometers 904 to the on-board control and data recording system 12. Hence, given the positions and velocity vectors for the individual guns 807 at the time of the last acoustic calibration, the accelerometer data enables the system to determine changes in the position of each individual gun 807 during the interval between the acoustic calibration and the upcoming shot point. While conventional marine seismic surveying systems must make rough assumptions as to the movement of the source guns 807 for the time period between the last acoustic calibration and each shot point, the presently-disclosed technique uses the data from the accelerometers 904 to more accurately track the actual movement of the source guns 807 during this period.

Per block 1006, the shot point is triggered. This generates the seismic signal for the purposes of the seismic survey. As discussed above, compared to conventional systems, the positions of each individual source are more accurately known at the time that the shot point is triggered. This results in more accurate source position information which leads to greater accuracy in the seismic data obtained.

Figure 11:
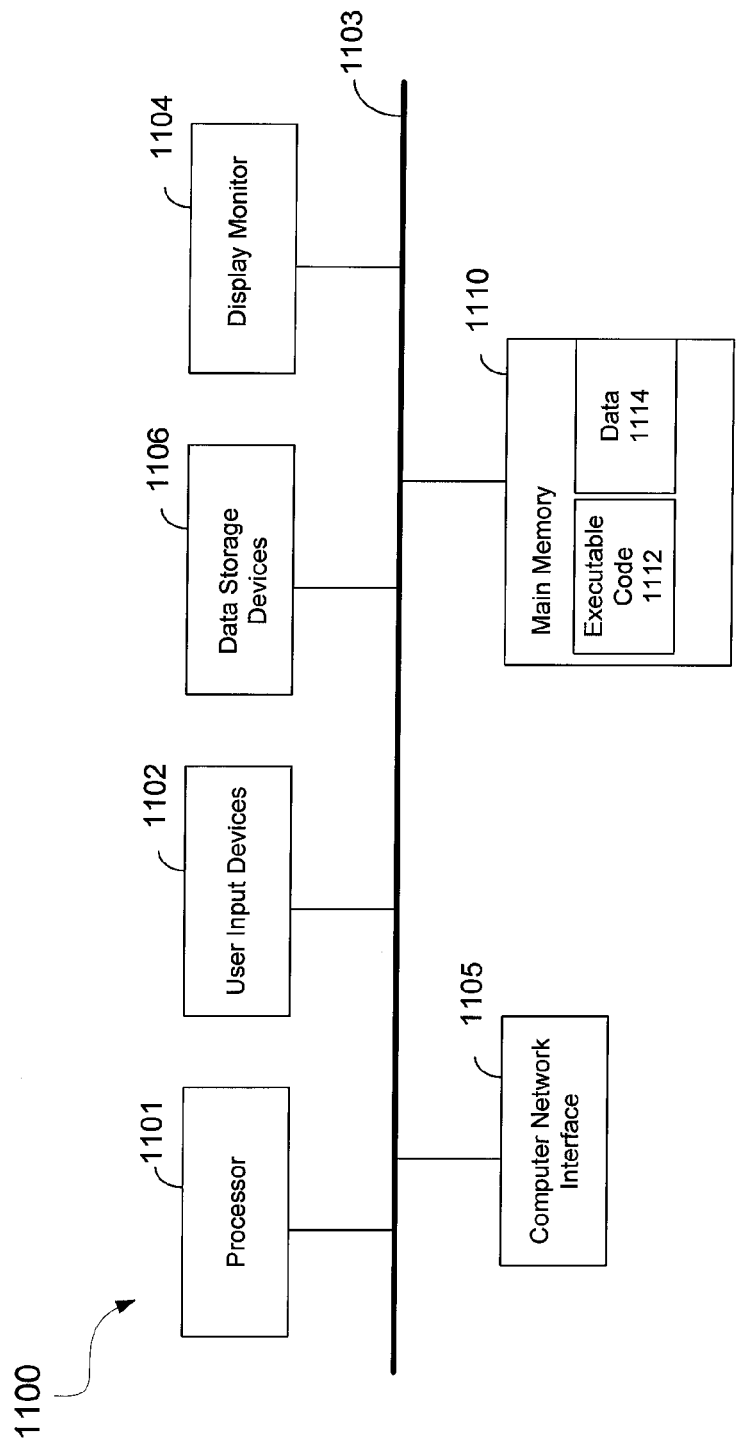
FIG. 11 is a schematic diagram showing an example computer apparatus in accordance with an embodiment of the invention.

FIG. 11 is a schematic diagram showing a computer apparatus 1100 in accordance with an embodiment of the invention. The computer apparatus 1100 may be configured with executable instructions so as to perform the data processing methods described herein. This figure shows just one example of a computer which may be used to perform the data processing methods described herein. Many other types of computers may also be employed, such as multi-processor computers, server computers, cloud computing via a computer network, and so forth.

The computer apparatus 1100 may include a processor 1101, such as those from the Intel Corporation of Santa Clara, Calif., for example. The computer apparatus 1100 may have a bus system 1103 communicatively interconnecting its various components. The computer apparatus 1100 may include one or more user input devices 1102 (e.g., keyboard, mouse), a display monitor 1104 (e.g., LCD, flat panel monitor, CRT), a computer network interface 1105 (e.g., network adapter, modem), and a data storage system which may include one or more data storage devices 1106 (e.g., hard drive, optical disk, USB memory) and a main memory 1110 (e.g., RAM).

In the example shown in this figure, the main memory 1110 includes executable code 1112 and data 1114. The executable code 1112 may comprise computer-readable program code (i.e., software) components which may be loaded from the data storage device 1106 to the main memory 1110 for execution by the processor 1101. In particular, the executable code 1112 may be configured to perform computer-implemented steps in the methods described herein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method performed during a marine seismic survey, the method comprising:
    towing a plurality of nodes in a body of water over a survey area;
    calibrating positions of the plurality of nodes using acoustic ranging signals between acoustic transceivers at the nodes; and
    tracking changes in positions of the plurality of nodes using accelerometers,
    wherein the positions of the nodes are calibrated at acoustic calibration intervals and are tracked at a series of times between the acoustic calibration intervals.

2. The method of claim 1, wherein the plurality of nodes are towed in the body of water using multiple streamers.

3. The method of claim 2, further comprising:
    detecting a traveling wave which accelerates a subset of the nodes; and
    projecting an effect of the traveling wave on a subset of steering devices on the multiple streamers in a projected path of the traveling wave by extrapolating motion of the traveling wave over time to predict a future effect of the traveling wave on the subset of steering devices.

4. The method of claim 3, further comprising:
    computing time-dependent control signals to be applied at the subset of steering devices to counter the projected effect of the traveling wave; and
    applying the time-dependent control signals to the subset of steering devices to maintain their relative positions within the subset of steering devices.

5. The method of claim 1, wherein the positions of the plurality of nodes are re-calibrated further comprising:
    recalibrating the positions of the plurality of nodes using the acoustic ranging signals between the acoustic transceivers at the nodes when a deviation of at least one node from an expected position exceeds a threshold distance.

6. The method of claim 5, wherein the deviation is computed as a difference between a predicted change in position of the acoustic node based at least in part on global positioning system data and an accelerometer-determined change in position of the acoustic node.

7. The method of claim 1, wherein tracking the changes in the positions of the plurality of nodes includes using compass devices to determine directional orientations of the nodes.

8. The method of claim 1, wherein the plurality of nodes comprise seismic source devices.

9. The method of claim 8, wherein the positions of the nodes are calibrated at an acoustic calibration time and are tracked at a series of times between the acoustic calibration time and a triggering of a next shot point.

10. The method of claim 9, wherein the seismic source devices comprise devices from a group of devices including air guns and water guns.

11. An apparatus for marine seismic surveying, the apparatus comprising:
    a plurality of acoustic transceivers configured to be towed by a vessel in a body of water;
    a plurality of accelerometers configured to be towed by the vessel in the body of water; and
    a control apparatus communicatively coupled to the acoustic transceivers and the accelerometers, wherein the control apparatus is configured to calibrate positions of the acoustic transceivers and track changes in positions of the accelerometers, wherein the control apparatus is further configured to track the positions of the accelerometers at a series of times from a preceding acoustic calibration time to a next acoustic calibration time.

12. The apparatus of claim 11, further comprising:
    multiple streamers which are spaced apart and configured to tow the plurality of acoustic transceivers and the plurality of accelerometers in the body of water.

13. The apparatus of claim 12, further comprising:
    compass devices on the multiple streamers, the compass devices configured to transmit directional orientation data to the control apparatus for use in conjunction with accelerometer data from the accelerometers.

14. The apparatus of claim 12, further comprising a plurality of steering devices on the multiple streamers, wherein the control apparatus is further configured to detect a traveling wave which impacts at least a portion of a streamer and project an effect of the traveling wave on a subset of the steering devices that are in a projected path of the traveling wave by extrapolating motion of the traveling wave over time to predict a future effect of the traveling wave on the subset of steering devices.

15. The apparatus of claim 14, wherein the control apparatus is further configured to compute time-dependent control signals to be applied at the subset of steering devices to counter the projected effect of the traveling wave; and send the time-dependent control signals to the subset of steering devices.

16. The apparatus of claim 11, wherein the control apparatus is further configured to re-calibrate the positions of the plurality of acoustic transceivers when a deviation of at least one accelerometer from an expected position exceeds a threshold distance.

17. The apparatus of claim 16, wherein the control apparatus is further configured to determine the deviation by computing a difference between an accelerometer-determined change in position and a predicted change in position based at least in part on global positioning system data.

18. The apparatus of claim 11, wherein the plurality of acoustic transceivers and the plurality of accelerometers are attached to seismic source devices.

19. The apparatus of claim 18, wherein the positions of the seismic source devices are calibrated at an acoustic calibration time and are tracked at a series of times between the acoustic calibration time and a triggering of a next shot point.

20. The apparatus of claim 19, wherein the seismic source devices comprise devices from a group of devices including air guns and water guns.

21. A method of maintaining a spread of nodes during a marine seismic survey, the method comprising:
   towing the nodes on multiple streamers that are spaced apart;
   detecting a traveling wave which accelerates a subset of the nodes;
   projecting an effect of the traveling wave on a subset of steering devices on the multiple streamers, the subset of steering devices being in a projected path of the traveling wave, by extrapolating motion of the traveling wave over time to predict a future effect of the traveling wave on the subset of steering devices;
   computing time-dependent control signals to be applied at the subset of steering devices to counter the projected effect of the traveling wave; and
   applying the time-dependent control signals to the subset of steering devices to maintain a local streamer geometry.

* * * * *